United States Patent
Bassoli

(10) Patent No.: US 11,248,198 B2
(45) Date of Patent: Feb. 15, 2022

(54) SPIRITS PREPARED FROM COLD BREW COFFEE GROUNDS

(71) Applicant: Starbucks Corporation, Seattle, WA (US)

(72) Inventor: Denisley Gentil Bassoli, Renton, WA (US)

(73) Assignee: Starbucks Corporation, Seattle, WA (US)

( * ) Notice: Subject to any disclaimer, the term of this patent is extended or adjusted under 35 U.S.C. 154(b) by 489 days.

(21) Appl. No.: 16/016,024

(22) Filed: Jun. 22, 2018

(65) Prior Publication Data

US 2019/0390147 A1  Dec. 26, 2019

(51) Int. Cl.
*C12G 3/02* (2019.01)
*A23F 5/24* (2006.01)
*A23F 5/26* (2006.01)

(52) U.S. Cl.
CPC .............. *C12G 3/02* (2013.01); *A23F 5/246* (2013.01); *A23F 5/26* (2013.01)

(58) Field of Classification Search
CPC ... A23F 5/246; A23F 5/26; A23F 5/10; C12G 3/02; C12G 3/024; C12H 6/02
See application file for complete search history.

(56) References Cited

U.S. PATENT DOCUMENTS

| | | | |
|---|---|---|---|
| 7,220,440 B2 | 5/2007 | Dria et al. | |
| 8,771,769 B2 | 7/2014 | Smyth et al. | |
| 9,364,012 B2 | 6/2016 | Pellegrini | |
| 2002/0155209 A1 | 10/2002 | Hardesty et al. | |
| 2004/0180112 A1* | 9/2004 | Hagiwara | C12G 3/024 426/11 |
| 2005/0271777 A1 | 12/2005 | Orsini | |
| 2014/0106038 A1 | 4/2014 | Buschmann | |
| 2015/0250198 A1 | 9/2015 | Piskorz et al. | |
| 2019/0387764 A1 | 12/2019 | Bassoli | |

FOREIGN PATENT DOCUMENTS

| | | |
|---|---|---|
| EP | 0837126 | 4/1998 |
| EP | 1 593 735 | 11/2005 |
| WO | WO 03/010279 | 2/2003 |
| WO | WO 2019/245631 | 12/2019 |
| WO | WO 2019/245632 | 12/2019 |

OTHER PUBLICATIONS

Sampaio et al, Production, chemical characterization, and sensory profile of a novel spirit elaborated from spent coffee ground, Dec. 2013, LWT—Food Science and Technology vol. 54 Issue 2, pp. 557-563 https://www.sciencedirect.com/science/article/pii/S0023643813002065 (Year: 2013).*
International Search Report and Written Opinion in corresponding PCT/US2019/026119 dated Jul. 1, 2019 in 16 pages.
International Search Report and Written Opinion in corresponding PCT/US2019/026084 dated Aug. 30, 2019 in 13 pages.
Dadi et al., "Valorization of coffee byproducts for bioethanol production using lignocellulosic yeast fermentation and pervaporation", International Journal of Environmental Science and Technology, Aug. 2017, vol. 15, Issue 4, pp. 821-832.
Aqua-Cale: Alcoholic Beverage, published online at least by Oct. 26, 2015 at: https://web.archive.org/web/20151026024531/https://www.aqua-calc.com/calculate/food-volume-to-weight/substance/alcoholic-blank-beverage-coma-and-blank-distilled-coma-and-blank-all-blank, (Year: 2015).
Wiki: Coffee production, published online at least by Mar. 6, 2013 at: https://web.archive.org/web/20130306130404/http:1/en.wikipedia.org:80/wiki/Coffee_production#Dry_process, (Year: 2013).
Bruner, "Wine-Infused Coffee is Here So You Officially Can Now Have It Both Ways", Time: Food and Drink; published online at least by Mar. 4, 2017 at: https://web.archive.org/web/20170403181919/https://time.com/4690609/wine-infused-coffee/ (Year: 2017).
Jack Daniel's™: Tennessee Whiskey Coffee; published online at least by Nov. 5, 2016 at: https://web.archive.org/web/ 20161105024843/http://www.jackdanielscoffee.com/ (Year: 2016).
Recycle Scrap Wood for the Enhancement of Spirits; published online at least by Apr. 11, 2017 at: https://web.archive.org/web/20170411033902/http://www.instructables.com/id/Recycle-Scrap-Wood-for-the-Enhancement-of-Spirits/ (Year: 2017).
Woodchucks Wood: Box full of scrap; published online at least by Mar. 19, 2017 at: https://www.amazon.com/ Full-Scrap-Boards-Shorter-Lengths/dp/B01D7MYAVC/ref=cm_cr_arp_d_product_top?ie=UTF8 (Year: 2017).
Time and Oak Signature Whiskey Elements, published online at least by Jan. 26, 2015 (as evidenced by the comment by Jane Y) at: https://www.amazon.com/Time-Oak-Signature-Whiskey-Elements/dp/B0765BGPS1 (Year: 2015).
Eckelman, "Wood Moisture Calculations", Perdue University Dept. of Forestry & Natural Resources, 1997.

* cited by examiner

*Primary Examiner* — Vera Stulii
(74) *Attorney, Agent, or Firm* — Knobbe Martens Olson & Bear LLP

(57) ABSTRACT

Several embodiments of the present disclosure relate to distilled coffee spirits, and techniques and methods for preparing the same. In some embodiments, a distilled coffee spirit is prepared by diluting cold brew coffee grounds into a fermentation mixture, fermenting the fermentation mixture with a fermentation agent, and distilling the entire fermentation mixture to produce a distilled coffee beverage.

12 Claims, 1 Drawing Sheet

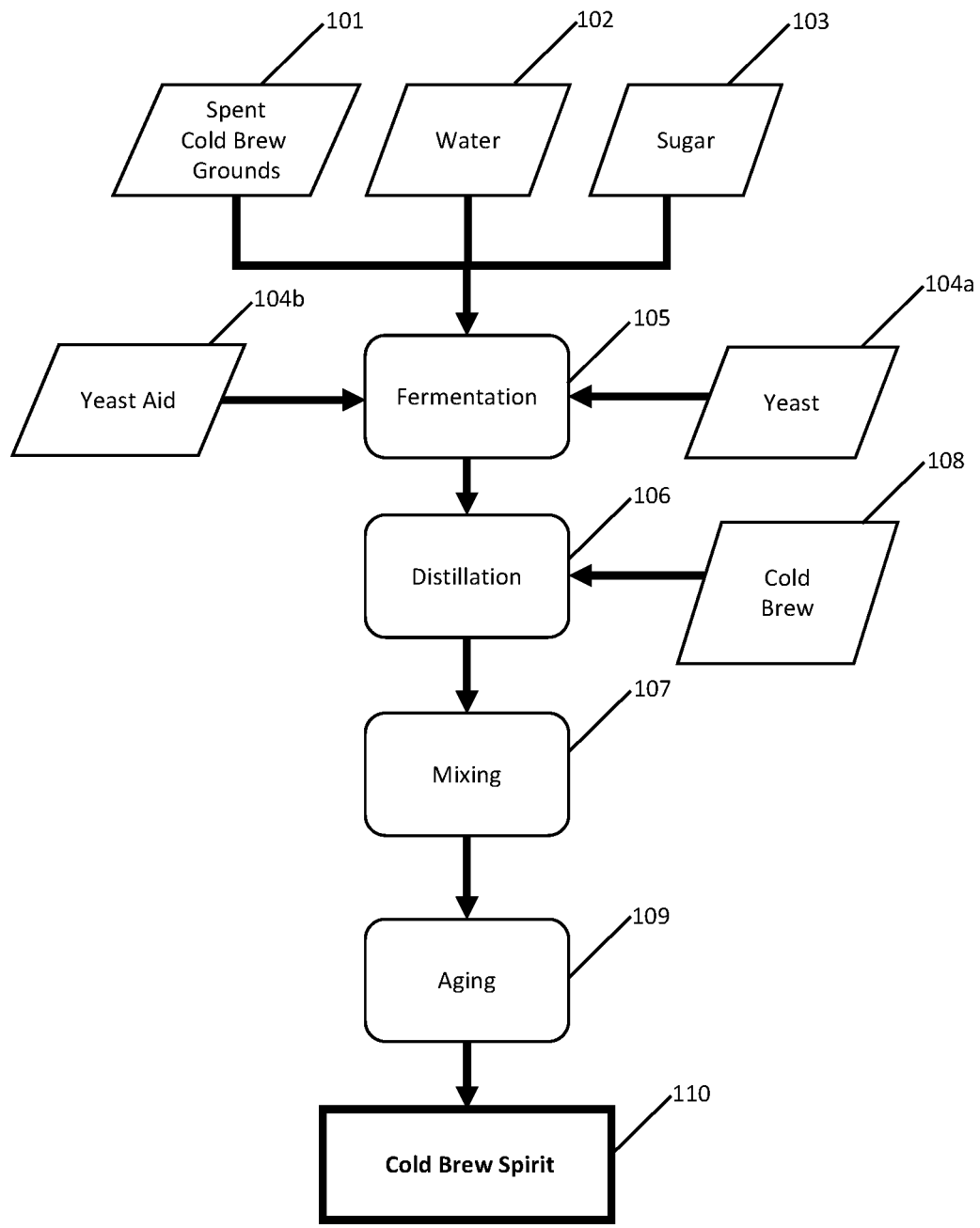

SPIRITS PREPARED FROM COLD BREW COFFEE GROUNDS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

Several embodiments of the present disclosure relate to alcoholic coffee beverages and methods of preparing the same.

BACKGROUND

Coffee beverages are popular among consumers. Coffee beverages are typically prepared by steeping ground, roasted coffee beans in a solution of hot water for several minutes. As the mixture steeps, many desirable flavor and nutritional compounds found within the roasted, ground beans are dissolved into the solution. The rate at which these desirable flavor and nutritional compounds are extracted depends on several factors, including the surface area of the beans exposed to the water, and the temperature of the water. For instance, smaller particles produced using a finer grind tend to undergo extraction more quickly by virtue of the increased surface area. Similarly, extraction proceeds more quickly and completely where hot water is employed.

Alcoholic beverages are also popular among consumers, particularly mixed-drinks where alcohol is mixed with fruits, juices, sodas, or other beverages, such as coffee. Alcoholic beverages are typically prepared by fermenting a sugar source. For instance, beer is prepared by mashing a grain, such as barley or wheat, in a hot water mixture to release the sugars and other desirable flavor compounds from the grain into the solution. Additional sugars are typically added, along with a fermentation agent such as yeast. The fermentation agent metabolizes the sugar in the solution to produce ethyl alcohol. Eventually, the alcohol concentration in the solution reaches toxic levels for the fermentation agent, and fermentation ceases.

SUMMARY

While the natural concentration of alcohol obtained through fermentation is typically sufficient for beers, wines, and the like, mixed drinks frequently employ the use of spirits. Spirits are prepared by distilling the fermented solution to further concentrate the alcohol. The concentrated alcohol may then be used in the preparation of mixed-drinks. For instance, some coffee-based mixed drinks are prepared by incorporating a distilled spirit into a coffee extract along with cream or sugar. However, the flavor profile of the spirit is closely related to the sugar source used as a substrate for fermentation, which may clash with the complex flavors of the coffee extract. Moreover, coffee grounds which have been used to prepare hot coffee extracts do not contain sufficient sugars, oils, and fats to yield a rich, full-flavored spirit when used as a substrate for fermentation. Accordingly, a demand exists for a more premium coffee spirit.

Described herein are techniques and methods for producing a distilled coffee spirit. In some embodiments, the method may comprise reducing coffee beans to particles; extracting the coffee bean particles in an aqueous solution at a temperature between 0° C. and 90° C.; separating the coffee bean particles from the aqueous solution to yield spent coffee bean particles; forming a fermentation mixture by: adding sugar to the spent coffee bean particles; adding water to the spent coffee bean particles; adding a fermentation agent to the spent coffee bean particles; fermenting the fermentation mixture; and distilling the fermentation mixture to obtain the distilled coffee spirit. In various configurations, the temperature of the aqueous extraction solution may range from 0° C. to 90° C., such as about 0° C.; about 10° C.; about 20° C.; about 30° C.; about 40° C.; about 50° C.; about 60° C.; about 70° C.; about 80° C.; about 90° C.; and any value therein. In some embodiments, the sugar is selected from one or more of the group consisting of: cane sugar, white sugar, light brown sugar, dark brown sugar, demerara, turbinado, or muscovado. In several embodiments, alternative sugar-containing compounds, e.g., natural sweeteners, are used, such as honey (e.g., raw honey), date or other fruit puree or jam, coconut sugar, maple syrup, molasses (e.g., blackstrap molasses), brown rice syrup, and the like. In some embodiments, the fermentation agent is a yeast. For instance, in some configurations, the fermentation agent may be a brewer's yeast, such as *Saccharomyces cerevisae*, or subspecies RL-11. In various additional configurations, the fermentation agent may be another species of fungus or bacteria, such as *Schizosaccharomyces, Zymomonas mobilis, Lactobacillus, Pediococcus, Bifidobacterium*, and the like, including combinations thereof. In some configurations, the fermentation agent is incorporated in an amount ranging from about 0.5 g/L to about 2 g/L, such as about 0.5 g/L; about 0.6 g/L; about 0.7 g/L; about 0.8 g/L; about 0.9 g/L; about 1.0 g/L; about 1.1 g/L; about 1.2 g/L; about 1.3 g/L; about 1.4 g/L; about 1.5 g/L; about 1.6 g/L; about 1.7 g/L; about 1.8 g/L; about 1.9 g/L; about 2.0 g/L; and any value therein. In various configurations, the fermentation agent may be added in conjunction with a fermentation aid, such as potassium metabisulfite. For instance, in some embodiments, the fermentation agent ins added in conjunction with potassium metabisulfite in an amount ranging from about 100 mg/L to about 300 mg/L, such as about 100 mg/L; about 120 mg/L; about 140 mg/L; about 160 mg/L; about 180 mg/L; about 200 mg/L; about 220 mg/L; about 240 mg/L; about 260 mg/L; about 280 mg/L; about 300 mg/L; or any value therein.

In some embodiments, a buffering agent is added to the fermentation mixture. The buffering agent may be calcium carbonate. In various configurations, the pH of the fermentation mixture may be maintained at about 5.0 to about 6.0 during fermentation, such as a pH of about 5.0; about 5.1; about 5.2; about 5.3; about 5.4; about 5.6; about 5.7; about 5.8; about 5.9; about 6.0; and any value therein. In some embodiments, fermentation may be allowed to proceed for a period ranging from about 4 days to about 10 days, such as about 4 days; about 5 days; about 6 days; about 7 days; about 8 days; about 9 days; about 10 days; and any value therein. In some configurations, the fermentation process occurs at a temperature of about 20° C. to about 30° C.; such as about 20° C.; about 21° C.; about 22° C.; about 23° C.; about 24° C.; about 25° C.; about 26° C.; about 27° C.; about 28° C.; about 29° C.; about 30° C.; and any value therein. In various configurations, the entire fermentation mixture is transferred to a still for distillation. In some embodiments, the method further comprises the step of aging the distilled coffee spirit in a wooden barrel.

In some embodiments, the techniques and methods disclosed herein relate to a method of preparing an alcoholic coffee beverage. In various configurations, the method comprises: providing extracted coffee bean particles; diluting the extracted coffee bean particles in water; adding a fermentation agent to the solution of extracted coffee bean particles; fermenting the solution of extracted coffee bean particles with a fermentation agent; and distilling the fermentation mixture to obtain the alcoholic coffee beverage. In some embodiments, the extracted coffee bean particles are extracted with a solvent at a temperature less than 90° C., such as about 90° C.; about 80° C.; about 70° C.; about 60° C.; about 50° C.; about 40° C.; about 30° C.; about 20° C.; about 10° C.; about 0° C.; and any value therein. For instance, in some embodiments, the extracted coffee bean particles have been used to prepare a cold brew coffee extract. For example, in various configurations, the extracted coffee bean particles have not been subjected to water extraction at a temperature greater than 30° C. In this manner, a large proportion of the soluble solids remain within the coffee bean. Some examples of desirable soluble solids remaining within the bean include amino acids, proteins, fats, oils, and sugars. Particularly, residual sugars residing within the extracted coffee grounds provide an excellent fermentation substrate for the fermentation agent. The fermentation agent may be brewer's yeast, such as *Saccharomyces cerevisae*, though combinations of yeast strains may be used in some embodiments. In some embodiments, the entire fermentation mixture is transferred to a still for distillation. In some embodiments, coffee bean particles which have been previously extracted are referred to as spent coffee bean particles.

In some implementations, disclosed herein is a method of fermenting spent coffee grounds to prepare an alcoholic beverage. For instance, in some embodiments, the method comprises forming a slurry of spent coffee grounds, water, and a sugar containing compound; adding a fermenting yeast having an initial concentration of about 1 g/L of slurry; and distilling the slurry for 1 to 10 days to yield a distilled alcoholic beverage. For instance, in some embodiments, the slurry may be distilled for about 1 day; about 2 days; about 3 days; about 4 days; about 5 days; about 6 days; about 7 days; about 8 days; about 9 days; about 10 days; or any value therein. In some configurations, the method further comprises the step of aging the distilled alcoholic beverage in a wooden barrel (e.g., an oak, ash, cherry, walnut, or other type of barrel used for aging spirits) for a period ranging from about 4 days to about 30 days, such as about 4 days; about 5 days; about 6 days; about 7 days; about 8 days; about 9 days; about 10 days; about 11 days; about 12 days; about 13 days; about 14 days; about 15 days; about 16 days; about 17 days; about 18 days; about 19 days; about 20 days; about 21 days; about 22 days; about 23 days; about 24 days; about 25 days; about 26 days; about 27 days; about 28 days; about 29 days; about 30 days; and any value therein.

Several embodiments of the present disclosure further relates to a coffee-based alcoholic beverage. In various configurations, the coffee-based alcoholic beverage is prepared by a process comprising the steps of: providing coffee bean particles; diluting the extracted coffee bean particles in water; adding a fermentation agent to the solution of spent coffee bean particles; fermenting the solution of spent coffee bean particles with a fermentation agent; and distilling the fermentation mixture to obtain the alcoholic coffee beverage. In some embodiments, the coffee bean particles have been previously extracted with water at a temperature ranging from about 0° C. to about 80° C. Similarly, in some embodiments, residual sugars remaining within the bean after the extraction provide a source of sugar for fermentation. In still further embodiments, the process further comprises the step of aging the distilled alcoholic coffee beverage in a wooden barrel. In some embodiments, the alcohol content of the coffee-based alcoholic beverage ranges from about 30 GL to about 50 GL.

In various embodiments of the present disclosure, a coffee-based alcoholic beverage is disclosed. In some embodiments, the coffee-based alcoholic beverage is prepared by a process comprising the steps of: providing coffee bean particles; diluting the extracted coffee bean particles in water; adding a fermentation agent to the solution of spent coffee bean particles; fermenting the solution of spent coffee bean particles with a fermentation agent; and distilling the fermentation mixture to obtain the alcoholic coffee beverage. In some embodiments, the coffee bean particles have been previously extracted with water at a temperature ranging from about 0° C. to about 80° C. In this manner, residual sugars remaining within the bean after the initial extraction may provide a source of sugar for fermentation. Furthermore, in some embodiments, the process further comprises step of: aging the distilled alcoholic coffee beverage in a wooden barrel. In some embodiments, the coffee-based alcoholic beverage has an alcohol content of about 30 GL to about 50 GL.

In some embodiments, the present disclosure relates to a coffee-based alcoholic beverage comprising: about 20% to about 80% of a middle cut resulting from a distillation of a fermentation of extracted coffee grounds, wherein the coffee grounds have been extracted with water having a temperature less than 80° C., and optionally further comprising: up to about 20% of a feint from the distillation; and up to about 20% of a foreshot from the distillation. In still further embodiments, the coffee-based alcoholic beverage has an alcohol content of about 30 GL to about 50 GL. In still further embodiments, the coffee based alcoholic beverage further comprises up to 80% of a cold brew coffee extract.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure. The foregoing aspects and many of the attendant advantages of the present disclosure will become more readily appreciated as the same become better understood by reference to the following detailed description, when taken in conjunction with the accompanying drawings, wherein:

FIG. 1 depicts a non-limiting embodiment of a process flow for preparing a cold brew spirit in accordance with the techniques and methods disclosed herein.

DETAILED DESCRIPTION

Alcoholic beverages are prepared through the process of fermentation. Fermentation occurs where microorganisms metabolize a fermentation substrate comprising a sugar source in the absence of oxygen to yield ethyl alcohol, along with various by-products. The sugar source is typically a grain, though additional sugar may be added to the fermentation substrate for added flavor, and to supplement the naturally occurring sugars. A wide assortment of alcoholic beverages having a similarly broad array of tastes and flavor profiles may be prepared by fermenting additional or alternate sugar sources. For instance, many beers are commonly prepared by fermenting barley, which can produce full-bodied beers having a thick, rich character. By altering the fermented grain, brewers can tailor the flavor profile to achieve a specific taste. For instance, American brewers frequently employ corn and rice in the fermented grain mixture in order to lighten and smooth the flavor profile of the beverage. Similarly, German brewers frequently utilize fermentation mixtures having a high proportion of wheat to produce smooth, light beers having a creamy consistency.

Fermented beverages such as wine and beer are limited in the alcohol concentration they can achieve. This is because the ethyl alcohol produced by the fermentation agent is also toxic to the fermentation agent (e.g., yeast). As such, the fermentation agent is typically inactivated once the alcohol concentration reaches about 8-14%, causing fermentation to cease. Nevertheless, higher alcohol content beverages may be prepared by distilling the mixture to concentrate the alcohol. These distilled beverages are referred to as spirits herein.

Like beer, spirits may be prepared having a wide variety of flavor profiles, owing in part to differences in the fermentation substrate. As such, regional varieties of spirits are available, each having a distinct flavor profile due to the different grains used in the initial fermentation stages. For instance, whiskeys are distilled spirits prepared from fermented grains, and a vast array of whiskeys prepared from a similarly broad assortment of grains are available. For instance, Bourbon whiskey is prepared from a fermentation mixture including predominantly corn, and has a distinct flavor from Scotch whisky, which is predominately prepared from barley. In view of the foregoing, and as described in connection with several embodiments herein, the flavor characteristics of a distilled alcoholic beverage depend on characteristics of the fermentation substrate used to prepare the beverage.

Alcoholic coffee beverages are a desirable choice among consumers. However, most alcoholic coffee beverages are prepared by adding a highly distilled, neutral flavor alcohol into a coffee extract, rather than incorporating coffee beans into the fermentation mixture. As such, these beverages may be considered coffee-based mixed drinks, rather than coffee-based spirits.

In the interest of economics, some manufacturers have attempted to incorporate previously extracted spent coffee grounds into a fermentation mixture for the production of alcoholic coffee beverages. However, coffee beverages are typically prepared by extracting ground coffee bean particles in hot water. The hot water used in a typical coffee extraction strips the coffee beans of a large proportion of the desirable sugars, fats, oils, and other flavor compounds that are responsible for creating a rich, full-bodied brewed coffee drink. As such, the spent grounds used to produce these alcoholic coffee beverages may no longer contain the desirable sugars and other flavor compounds (at least not in the amounts used to make a brewed coffee beverage) and therefore may serve as a poor fermentation substrate, requiring large additions of refined sugar to fuel the fermentation agent. Furthermore, since the spent coffee grounds lack many of the sugars, fats, and oils responsible for the complex flavor profile of a brewed coffee drink, such fermented mixtures lack much of the coffee flavor, aroma, and character which consumers might expect from a coffee spirit. These problems are exacerbated where manufacturers utilize soluble coffee extracts, which lend a hydrolyzed and burnt flavor to the final product. Accordingly, a demand exists for a higher quality coffee spirit.

Described herein are alcoholic spirits derived from coffee beans and techniques and methods for preparing such high quality alcoholic spirits from coffee beans. In various configurations, the coffee beans are ground and diluted with water to form a fermentation mixture. In some embodiments, additional sugar or other fermentation aids may be incorporated into the fermentation mixture as well. A fermentation agent may be added to the fermentation mixture to initiate fermentation. The fermentation mixture is then allowed to ferment, during which time the fermentation agent metabolizes the sugars resident in the fermentation mixture to yield ethyl alcohol. After fermentation, all or a portion of the fermentation mixture may be transferred to a still. The mixture may then be distilled to concentrate the alcohol to produce alcoholic spirits from coffee beans, e.g., a coffee spirit. Depending on the embodiment, the coffee spirit may then be consumed immediately, packaged for later consumption, or subjected to further processing, such as barrel-aging.

Depicted at FIG. 1 is a non-limiting process flow for preparing a coffee spirit in accordance with the techniques and methods disclosed herein. In box 101, coffee beans are provided. It will be appreciated that a wide assortment of coffee beans may be employed within the scope of the present disclosure. For instance, in some embodiments the coffee beans may be roasted whole coffee beans, for example, yellow coffee beans, red coffee beans, partially roasted coffee beans, dark roast coffee beans, light roast coffee beans, non-decaffeinated coffee, partially decaffeinated coffee, fully decaffeinated coffee, or unroasted green coffee beans. The coffee used can be any variety or species from any part of the world, including blends thereof. For example, *Arabica, Robusta*, and any blend of *Arabica & Robusta* from any part of the world (such as Brazil, Indonesia, Central America, Africa, and the like). In some configurations, the coffee beans may comprise at least one of green coffee cherries, red coffee cherries, coffee flowers, coffee cherry skin, coffee cherry pulp, coffee cherry stalk, coffee cherry silverskin, coffee cherry mucilage, coffee cherry parchment, coffee cherry exocarp, coffee cherry mesocarp, and the like. Combinations of beans may be used in several embodiments.

In various configurations, the coffee beans are ground, or otherwise reduced to particles. A variety of methods exist for reducing coffee beans to particles, and nearly any type of grinding equipment can be used within the context of the present disclosure to grind the beans. Non-limiting examples of grinding equipment include a cage mill, a hammer mill, a single-stage roller grinder, a multistage roller grinder, and the like. The beans may be reduced to an average particle size, as measured by mean particle diameter, ranging from about 90 μm to about 2,000 μm; including about 90 μm; about 100 μm; about 120 μm; about 140 μm; about 150 μm; about 170 μm; about 180 μm; about 200 μm; about 220 μm; about 250 μm; about 275 μm; about 300 μm; about 330 μm; about 360 μm; about 400 μm; about 450 μm; about 500 μm; about 750 μm; about 1,000 μm; about 1,200 μm; about 1,400 μm; about 1,500 μm; about 1750 μm; about 1900 μm; about 2000 μm; and any value therein. It will be appreciated that a smaller particle size increases the available surface area of the particulate, promoting efficient extraction and fermentation. Thus, depending on the embodiment, the size of the coffee particle can be modified to aid in tailoring a flavor profile of the resulting spirit. In a similar manner, the flavors and aromas of the resultant coffee spirit may be modified by altering the fermentation profile, such as modifying the length of fermentation, the temperature of fermentation, and the like.

In various configurations, the coffee bean particles used in embodiments disclosed herein have been extracted prior to fermentation. For instance, the coffee bean particles may have been previously extracted to prepare a coffee beverage. Any suitable solvent may be employed to extract the coffee bean particles prior to fermentation. Typically, the extraction is performed using water, though any alternate solvent may be employed, such as ethanol, hexane, carbon dioxide, and the like. In some embodiments, the coffee bean particles are extracted with relatively cool water, such as about 0° C. to about 80° C., such as about 0° C.; about 10° C.; about 15° C.; about 20° C.; about 25° C.; about 30° C.; about 35° C.; about 40° C.; about 45° C.; about 50° C.; about 55° C., about 60° C.; about 70° C.; about 80° C.; and any value therein.

For example, in various configurations, the extracted coffee bean particles have not been subjected to water extraction at a temperature greater than 30° C. The relatively low temperature of the extraction solvent, in comparison to typical hot coffee preparations, allows certain desirable, soluble compounds such as amino acids, proteins, fats, oils, and sugars to remain within the ground coffee particles. In particular, residual sugars left within the beans after a cool water extraction may facilitate fermentation in later stages. For instance, in typical hot extract preparations, the total yield of extracted compounds from the coffee grounds is about 20%. Since a large proportion of the desirable flavor compounds have been extracted, as evidenced by the relatively high yield, spirits prepared by fermenting these grounds are characterized by weak, hollow flavor profiles lacking the full-bodied, rich, complex notes which might otherwise be obtained. By contrast, when cooler water is utilized as the solvent, such as in cold extract preparations, the final extract exhibits a much lower yield of about 10%. The reduced yield indicates that a substantial amount of desirable flavor compounds, such as sugars, oils, fats, and acids, remain within the beans. Advantageously, these residual sugars, oils, fats, acids, and associated compounds play an important role in producing a full-bodied, complex flavor profile in producing the fermented coffee spirits disclosed herein. As such, in various configurations, the ground coffee beans comprise extracted cold brew coffee grounds.

The coffee bean particles are diluted with water to form a slurry, as indicated at box 102. Typically, water will be added until the ratio of coffee bean particles to water ranges from about 1.5:1 to about 4:1; such as about 1.5:1; about 1.6:1; about 1.7:2; about 1.7:1; about 1.8:1; about 1.9:1; about 2.0:1; about 2.1:1; about 2.2:1; about 2.3:1; about 2.4:1; about 2.5:1; about 2.6:1; about 2.7:1; about 2.8:1; about 2.9:1; about 3.0:1; about 3.1:1; about 3.2:1; about 3.3:1; about 3.4:1; about 3.5:1; about 3.6:1; about 3.7:1; about 3.8:1; about 3.9:1; about 4.0:1; and any value therein. However, it will be appreciated that the precise ratio will depend on a variety of factors such as the desired flavor profile, and the particular characteristics of the fermentation mixture, including the degree to which the grounds were extracted prior to fermentation. In various configurations, the temperature of the water used to dilute the grounds may range from about 10° C. to about 30° C., such as about 10° C.; about 15° C.; about 20° C.; about 25° C.; about 30° C.; and any value therein. This aqueous slurry forms the base of the fermentation mixture, but additional nutrients or additives may also be incorporated.

For instance, as shown at box 103, additional portions of sugar may be added. The amount of alcohol produced is partly dependent on the amount of sugar in the fermentation mixture. As explained above, in various embodiments, the extracted coffee particles still retain a significant amount of their natural sugars by virtue of the reduced temperature extraction. Nevertheless, additional sugars may be incorporated at this stage to promote fermentation, and to alter the overall flavor profile of the mixture. The additional sugar incorporated into the fermentation mixture may take a variety of forms. Cane sugar is frequently employed within the techniques and methods disclosed herein, but other forms of sugar may be used as well, including: corn sugar, beet sugar, rice sugar, palm sugar, date sugar, maple sugar, coconut sugar, and the like. The degree to which the sugar has been refined may also be varied within the scope of the present disclosure. For instance, in certain configurations, the sugar may be a refined white sugar. In other embodiments, the sugar may be a light or dark brown sugar, such as a demerara, sucanat, turbinado, muscovado, jiggery, piloncillo, and the like. In some implementations, a combination of sugars may be employed to achieve a desired flavor profile, and to serve as a fermentation substrate.

The fermentation agent is added to the fermentation mixture, as depicted in box 104*a*. The fermentation agent is a microorganism or enzyme capable of converting the sugars resident within the fermentation mixture into ethanol, typically under anaerobic conditions. A typical fermentation agent is brewer's yeast, such as *Saccharomyces cerevisiae*. In certain configurations, *Saccharomyces cerevisiae* subspecies RL-11 may be used. However, it will be appreciated that a wide variety of fermentation agents may be employed without deviating from the scope of the present disclosure. For instance, in certain configurations, the fermentation may be selected from one or more of ale yeast, lager yeast, English yeast, Belgian yeast, German yeast, American yeast, Brettanomyces or even bacterial strains such as, *Acetobacter, Lactobacillus, Pediococcus*, and the like. In various embodiments, the fermentation agent can be added substantially all at once, or can be added in discrete amounts at various time intervals. For instance, in certain configurations, at least a second addition of fermentation agent may be incorporated after a certain period of time has elapsed, such as about 1 hour; about 2 hours; about 4 hours; about 8 hours. About 10 hours; about 12 hours; about 14 hours; about 18 hours; about 20 hours; about 22 hours; about 1 day; about 2 days; about 3 days; about 4 days; about 5 days; about 6 days; about 7 days; about 8 days; about 9 days; about 10 days; and any value therein. In other embodiments, at least a second addition of fermentation agent may be incorporated after the rate of fermentation has slowed. In this manner, it is possible to induce a secondary fermentation. Likewise, in various embodiments, the fermentation agent may be added alone, or along with additional sugars.

A suitable initial concentration of fermentation agent will depend on the characteristics of the fermentation mix, the fermentation agent selected, and environmental factors. In several embodiments, the initial concentration of fermentation agent may be about 1 dry gram of fermentation agent per liter of fermentation mixture. In various configurations, the initial concentration of fermentation agent may range from about 0.5 grams per liter, to about 2 grams per liter, while still producing a high-quality spirit. For instance, in various configurations, the initial concentration of fermentation agent may be about 0.5 g/L; about 0.75 g/L; about 1.0 g/L; about 1.25 g/L; about 1.5 g/L; about 1.75 g/L; about 2.0 g/L; and any value therein.

In some configurations, it can be advantageous to introduce additional fermentation aids into the fermentation mixture as well, as depicted at box 104b. For instance, the additional fermentation aids may provide improved conditions for fermentation to ensure that fermentation proceeds efficiently. For instance, in certain configurations potassium metabisulfite may be added as a sterilant and preservative in an amount ranging from about 100 mg/L to about 300 mg/L, such as about 100 mg/L; about 120 mg/L; about 140 mg/L; about 160 mg/L; about 180 mg/L; about 200 mg/L; about 220 mg/L; about 240 mg/L; about 260 mg/L; about 280 mg/L; about 300 mg/L; or any value therein.

The rate at which fermentation proceeds is partly dependent upon the pH of the fermentation mixture. Typically, fermentation will proceed more quickly under slightly acidic conditions. However, as with temperature, a pH that is too high or too low may run the risk of inactivating the fermentation agent. As such, in various configurations, it can be advantageous to control the pH of the fermentation mixture throughout the fermentation process to ensure that a consistent pH is maintained in order to promote efficient fermentation.

Accordingly, in some embodiments, buffering agents may be added to the fermentation mixture in order to help ensure that a consistent pH is maintained throughout the fermentation process, and to mitigate the effects that additional acids or bases generated during the fermentation process might otherwise have on the fermentation mixture. In various configurations, the pH of the fermentation mixture may be maintained at a slightly acidic pH ranging from about 5 to about 6 in order to prevent inactivation of the fermentation agent, and to promote efficient fermentation. Calcium carbonate has been found to be suitable buffering agent, although a wide variety of buffering agents may be employed, including: sodium lactate, calcium lactate, citric acid, sodium citrate, potassium citrate, succinic acid, sodium fumarate, calcium fumarate, and the like (including combinations thereof). In various embodiments, the buffering agent may be introduced in an amount ranging from about: 0.1 g/L to about 0.5 g/L, including about 0.1 g/L; about 0.2 g/L; about 0.3 g/L; about 0.4 g/L; about 0.5 g/L; or any value therein.

After the fermentation agent has been added, the fermentation mixture may then be allowed to ferment, as depicted in box 105. During the fermentation process, residual sugars within the coffee grounds—and additional sugars which have been added to the fermentation mixture—are metabolized by the fermentation agent. The fermentation agent produces ethyl alcohol as a byproduct. As fermentation progresses, the ethyl alcohol content of the fermentation mixture will continue to increase until the sugars are consumed, or until the alcohol concentration reaches sufficient levels to inactivate the fermentation agent. To help facilitate homogenous fermentation, the mixture may be subjected to gentle agitation during all, or a portion, of the fermentation process. In various configurations, fermentation may be halted by heating the fermentation mixture, or through the addition of chemical additives such as sodium bisulfite or potassium sorbate. Alternatively, fermentation may be allowed to continue until the fermentation agent is inactive and/or the available fermentable sugars are exhausted In several embodiments, a high-quality spirit may be obtained by allowing the fermentation mixture to ferment for a period ranging from about 4 to 10 days, such as about 4 days; about 5 days; about 6 days; about 7 days; about 8 days; about 9 days; about 10 days; or any value therein.

However, it should be appreciated that the rate at which fermentation proceeds is partly dependent upon the temperature of the fermentation mixture. At low temperatures, fermentation will proceed more slowly. Indeed, where the temperature is too low, the fermentation agent will fall dormant, and fermentation will cease at least until the temperature is increased. Similarly, fermentation will proceed more quickly at elevated temperatures. However, if temperatures rise too high, the fermentation agent may be thermally inactivated, and fermentation will cease until an additional portion of fermentation agent is introduced. In various embodiments, a suitable temperature for fermentation may range from about 20° C. to about 30° C., including about 20° C.; about 21° C.; about 22° C.; about 23° C.; about 24° C.; about; 25° C.; about 26° C.; about 27° C.; about; 28° C.; about 29° C.; about 30° C.; and any value therein. Depending on the embodiment, the temperature may be altered during the fermentation process. For instance, in certain configurations, the temperature may be increased during the fermentation process relative to the starting temperature of the fermentation process. In some embodiments, the temperature may be decreased during the fermentation process relative to the starting temperature of the fermentation process. In this manner, it will be appreciated that the temperature need not remain constant throughout the fermentation process.

After fermentation is completed, the mixture may be distilled to concentrate the alcohol to produce a spirit, as indicated at box 106. Distillation leverages the differences in boiling points between the various compounds within the fermented mixture. Within the context of the present disclosure, two compounds of particular interest are ethyl alcohol and water; ethyl alcohol boils at about 78° C., while water boils at 100° C., at standard atmospheric pressure. Accordingly, the differences in boiling point may be leveraged to selectively boil off the ethyl alcohol to be collected and concentrated into a spirit.

A variety of techniques may be employed to distill the fermented mixture, such as pot or column distillation. The use of a pot still allows the entire fermentation mixture to be transferred into the still to be heated as the distillation proceeds. By transferring some or the entire fermentation mixture into the still, additional flavor development will occur during the distillation process, as the heat from the still causes the various components within the fermented mixture to interact, ultimately producing a more complex flavor profile. In some embodiments, the fermentation mixture may be subjected to gentle agitation during all, or a portion, of the distillation process. Accordingly, various configurations employ the use of a pot still of sufficient size to house the fermentation mixture, although a column still or hybrid still may be employed in some embodiments.

After the fermentation mixture has been transferred to the still, distillation occurs in three fractions: the foreshot, middle cut, and feints. As discussed above, distillation leverages differences in boiling points between various components of the fermentation mixture to separate the components. As distillation proceeds, the various components boil at different stages, causing the composition of the distillation products to vary over time. The foreshot refers to the initial products of distillation, and contains a large number of volatile compounds having relatively low boiling points. The middlecut typically contains the highest concentration of ethyl alcohol, and typically represents the largest proportion of the final spirit. The feints represent the final components of the distillation which typically include various fusel oils. As will be appreciated, the foreshot and feint may be discarded, or portions of these cuts may be blended with the middle cut to achieve a desired flavor profile, as depicted in box 107. In particular, the fusel oils found in the feints may lend a desirable flavor profile, and additional complexity to the resultant spirit when blended in appropriate amounts, which can be determined by taste.

Furthermore, it may be desirable to add additional flavor components to the distilled spirit at this stage. In some embodiments, a coffee extract may be added to the distilled spirit to provide a bolder coffee flavor, as depicted in box 108. Additional flavoring can be added to the distilled spirit as well. One suitable flavor additive may include a coffee extract, such as a cold brew extract. However, it will be appreciated that a wide assortment of additional flavorings may be added as well. Non-limiting examples of flavoring include vanilla, chocolate, hazelnut, caramel, cinnamon, mint, eggnog, apple, apricot, aromatic bitters, banana, berry, blackberry, blueberry, celery, cherry, cranberry, strawberry, raspberry, juniper berry, brandy, cachaca, carrot, citrus, lemon, lime, orange, grapefruit, tangerine, coconut, cola, menthol, gin, ginger, licorice, milk, nut, almond, macadamia nut, peanut, pecan, pistachio, walnut, peach, pear, pepper, pineapple, plum, quinine, rum, white rum, dark rum, sangria, tea, black tea, green tea, tequila, tomato, top note, tropical, vermouth, dry vermouth, sweet vermouth, whiskey, bourbon whiskey, Irish whiskey, rye whiskey, Scotch whisky, Canadian whiskey, red pepper, black pepper, horseradish, wasabi, jalapeno pepper, chipotle pepper essential oils, concretes, absolutes, resins, resinoids, balms, tinctures, soybean oil, coconut oil, palm oil, kern oil, sunflower oil, peanut oil, almond oil, cocoa butte nutmeg oil, orange blossom absolute, orange oil, oregano oil, palmarosa oil, patchouli oil, *perilla* oil, parsley leaf oil, parsley seed oil, clove seed oil, peppermint oil, pepper oil, pimento oil, pine oil, poley oil, rose absolute, rose wood oil, rose oil, rosemary oil, sage oil, lavandin, sage oil Spanish, sandalwood oil, celery seed oil, lavender spike oil, star anis oil, *styrax* oil, *tagetes* oil, pine needle oil, tea-tree oil, turpentine oil, thyme oil, tolu balm, tonka absolute, tuberose absolute, vanilla extract, violet leaf absolute, *verbena* oil, vetiver oil, juniper berry oil, wine yeast oil, wormwood oil, wintergreen oil, cinnamon leaf oil, cinnamon bark oil, and the like, including any other type of food flavoring or edible substance or a combination thereof.

Once the distilled spirit has been collected and the desired flavoring components added, the final alcohol content of the distilled mixture may be adjusted through the addition of water to achieve a desired final alcohol concentration in the spirit. In various configurations, the final alcohol content of the distilled coffee spirit may range from about 30 degrees Gay-Lussac (GL) to about 50 GL, such as about 30 GL; about 31 GL; about 32 GL; about 33 GL; about 34 GL; about 35 GL; about 36 GL; about 37 GL; about 38 GL; about 39 GL; about 40 GL; about 41 GL; about 42 GL; about 43 GL; about 44 GL; about 45 GL; about 46 GL; about 47 GL; about 48 GL; about 49 GL; about 50 GL; or any value therein.

The distilled and flavored spirit may be consumed immediately, packaged for transport, or subjected to additional processing. For instance, in certain configurations, the distilled spirit may be aged, as depicted in box 109. Aging allows the flavor profile of the distilled spirit to mellow over time. In addition to smoothing out the flavor profile, in certain configurations, additional flavor development may occur during the aging process. In various embodiments, the distilled spirit may be aged for a period of time ranging from about 1 day to about 30 days, such as about 1 day; about 2 days; about 4 days; about 6 days; about 8 days; about 10 days; about 12 days; about 14 days; about 16 days; about 18 days; about 20 days; about 22 days; about 24 days; about 26 days; about 28 days; about 30 days; or any value therein. In some embodiments, the distilled spirit may be aged in a barrel, such as an oak barrel. The oak may be American oak, French oak, European oak, Spanish oak, oriental oak, red oak, scrub oak, and the like, although a variety of different woods may be employed, including: maple, sugar maple, hard maple, soft maple, silver maple, cherry wood, apple wood, orange wood, apricot wood, peach wood, plum wood, pear wood, mulberry wood, mesquite wood, hickory wood, chestnut wood, pecan wood, alder wood, cedar wood, ash wood, and the like. In various configurations the flavor and aroma profile of the wood may be altered prior to extraction. For instance, the pieces of wood may be smoked, toasted, charred, burnt, or natural.

It has been determined that distilled coffee spirits prepared in accordance with this disclosure exhibit a rich coffee flavor. Since the coffee grounds have not been subjected to high temperature extraction, the ground beans retain a significant amount of sugars and other natural flavor compounds which contribute to fermentation, and affect the final flavor profile of the distilled spirit. Moreover, by distilling the fermentation mixture in full, a unique flavor is achieved by allowing the fermentation components to interact under heat during the distillation, lending additional complexities and rich undertones to the beverage.

The foregoing discussion is presented to enable a person skilled in the art to make and use one or more of the present embodiments disclosed herein. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein. For instance, many examples described below relate to techniques and methods for preparing a fermented, distilled spirit from coffee grounds. Several embodiments are described in terms of previously extracted coffee grounds and cold brew coffee grounds. Nevertheless, it will be appreciated that the various features and aspects disclosed herein may be applied to a wide assortment of additional preparations, including coffee beans which have not been ground or extracted, and various additional implementations. As such, the present disclosure should not be interpreted as limited to the specific embodiments disclosed herein.

Moreover, although certain aspects, advantages, and features are described herein, it is not necessary that any particular embodiment include or achieve any or all of those aspects, advantages, and features. Some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

While the present embodiments have been described with respect to the foregoing, those skilled in the art will readily appreciate that various changes and/or modifications can be made to the invention without departing from the spirit or scope of the embodiments as defined by the appended claims. In addition, while certain aspects of the present embodiments are presented below in certain claim forms, the various aspects of the invention are contemplated in any available claim form.

As used herein, the term "beverage" has its ordinary and customary meaning, and includes, among other things, any edible liquid or substantially liquid substance or product having a flowing quality (e.g., juices, coffee beverages, teas, frozen yogurt, beer, wine, cocktails, liqueurs, spirits, cider, soft drinks, flavored water, energy drinks, soups, broths, combinations of the same, or the like).

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic.

Overall, the language of the claims is to be interpreted broadly based on the language employed in the claims. The claims are not to be limited to the non-exclusive embodiments and examples that are illustrated and described in this disclosure, or that are discussed during the prosecution of the application.

Those skilled in the art will also appreciate that in some embodiments the functionality provided by the components, structures, methods and processes discussed above may be provided in alternative ways, such as being split among more components or methods or consolidated into fewer components or methods. In addition, while various methods may be illustrated as being performed in a particular order, those skilled in the art will appreciate that in other embodiments the methods may be performed in other orders and in other manners.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage preparation systems, techniques and methods have been disclosed. Although the systems, techniques, and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A method of preparing a distilled coffee spirit, the method comprising:
   reducing coffee beans to particles;
   extracting the coffee bean particles in water at a temperature not greater than 30° C., wherein a total yield of extracted compounds from the coffee bean particles is about 10%;
   separating the coffee bean particles from the water to yield spent coffee bean particles;
   forming a fermentation mixture by:
      adding sugar to the spent coffee bean particles;
      adding water to the spent coffee bean particles;
      adding a fermentation agent to the spent coffee bean particles; and
      adding a fermentation aid to the spent coffee bean particles;
   fermenting the fermentation mixture to obtain a fermented solution; and
   distilling the fermented solution to obtain the distilled coffee spirit.

2. The method of claim 1, wherein the sugar is selected from one or more of the group consisting of: cane sugar, white sugar, light brown sugar, dark brown sugar, demerara, turbinado, or muscovado.

3. The method of claim 1, wherein the fermentation agent is brewer's yeast.

4. The method of claim 3, wherein the fermentation agent is *Saccharomyces cerevisae*.

5. The method of claim 1, wherein the fermentation agent is incorporated in an amount ranging from about 0.5 g/L to about 2 g/L.

6. The method of claim 1, further comprising the step of aging the distilled coffee spirit in a wooden barrel.

7. The method of claim 1, further comprising adding a buffering agent to the fermentation mixture.

8. The method of claim 7, wherein the buffering agent is calcium carbonate.

9. The method of claim 7, wherein the pH is maintained at about 5.0 to about 6.0 during fermentation.

10. The method of claim 1, wherein the fermentation mixture is allowed to ferment for a period of about 4 days to about 10 days.

11. The method of claim 1, wherein the fermentation mixture is allowed to ferment at a temperature of about 20° C. to about 30° C.

12. The method of claim 1, wherein substantially all of the fermented solution is transferred into a still for distilling the fermented solution.

* * * * *